United States Patent
Hedlund et al.

(10) Patent No.: US 12,275,218 B2
(45) Date of Patent: Apr. 15, 2025

(54) METHOD OF MANUFACTURING A BUILDING ELEMENT AND A BUILDING ELEMENT

(71) Applicant: Välinge Innovation AB, Viken (SE)

(72) Inventors: Anette Hedlund, Klippan (SE); Sofia Nilsson, Strandbaden (SE)

(73) Assignee: VÄLINGE INNOVATION AB, Viken (SE)

( * ) Notice: Subject to any disclaimer, the term of this patent is extended or adjusted under 35 U.S.C. 154(b) by 413 days.

(21) Appl. No.: 16/738,468

(22) Filed: Jan. 9, 2020

(65) Prior Publication Data
US 2020/0223197 A1 Jul. 16, 2020

(30) Foreign Application Priority Data
Jan. 10, 2019 (SE) .................. 1950022-2

(51) Int. Cl.
*B05D 1/30* (2006.01)
*B32B 27/20* (2006.01)
(Continued)

(52) U.S. Cl.
CPC ............ *B32B 27/20* (2013.01); *B05D 1/30* (2013.01); *B32B 27/42* (2013.01); *B32B 37/06* (2013.01);
(Continued)

(58) Field of Classification Search
CPC .. B05D 1/30; B05D 2401/32; B05D 2203/20; C09D 5/037; C09D 161/06; B32B 21/08;
(Continued)

(56) References Cited

U.S. PATENT DOCUMENTS 2,231,953 A 2/1941 Ruzicka
2,587,064 A 2/1952 Rapson
(Continued)

FOREIGN PATENT DOCUMENTS

AU 80284/75 6/1975
CA 2 557 096 A1 7/2005
(Continued)

OTHER PUBLICATIONS

Tegethoff (Ed.), Calcium Carbonate From the Cretaceous Period into the 21st Century, Chapter III and Chapter IV, 2001, Springer Basel AG, pp. 160-170 and 198-240. (Year: 2001).*
(Continued)

*Primary Examiner* — Monique R Jackson
(74) *Attorney, Agent, or Firm* — Boone IP Law (57) ABSTRACT

A method of manufacturing a building element, includes applying a first layer on a first surface of a substrate, the first layer including a mixture of a binder, at least one filler, and fine non-pigment cohesive particles, wherein an amount of the fine non-pigment cohesive particles in the mixture may be between 0.05 wt % and 9 wt % of the mixture to contribute to flowability of the mixture, and applying heat and/or pressure to the first layer and/or the substrate thereby forming the building element. The fine non-pigment cohesive particles may have a length in their largest dimension of 2.5 μm or less, and preferably include barium sulphate. The building element may be a building panel such as a floor panel or wall panel, a furniture component, mouldings, edging profiles, etc.

14 Claims, 4 Drawing Sheets

(51) Int. Cl.
  *B32B 27/42* (2006.01)
  *B32B 37/06* (2006.01)
  *B32B 37/10* (2006.01)
  *E04F 15/10* (2006.01)

(52) U.S. Cl.
  CPC ............ *B32B 37/10* (2013.01); *E04F 15/105* (2013.01); *B05D 2203/20* (2013.01); *B05D 2401/32* (2013.01); *B05D 2601/20* (2013.01); *B32B 2264/067* (2013.01); *B32B 2264/102* (2013.01); *B32B 2264/104* (2013.01); *B32B 2305/30* (2013.01); *B32B 2471/00* (2013.01)

(58) Field of Classification Search
  CPC ....... B32B 21/02; B32B 21/042; B32B 21/13; B32B 21/14; C08L 1/02; C08L 61/06; C08K 2003/3045
  See application file for complete search history.

(56) References Cited

U.S. PATENT DOCUMENTS

| | | |
|---|---|---|
| 2,831,793 A | 4/1958 | Elmendorf |
| 2,962,081 A | 11/1960 | Dobry et al. |
| 3,032,820 A | 5/1962 | Johnson |
| 3,135,643 A | 6/1964 | Michl |
| 3,164,648 A | 1/1965 | Franksson |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,353,973 A | 11/1967 | Jensen |
| 3,373,070 A | 3/1968 | Fuerst |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,615 A * | 5/1971 | Moore .................. C08G 59/68<br>524/904 |
| 3,647,500 A | 3/1972 | Mizuno |
| 3,673,020 A | 6/1972 | Jaeger |
| 3,674,619 A | 7/1972 | Scher |
| 3,793,125 A | 2/1974 | Kunz |
| 3,846,219 A | 11/1974 | Kunz |
| 3,880,687 A | 4/1975 | Elmendorf et al. |
| 3,897,185 A | 7/1975 | Beyer |
| 3,897,588 A | 7/1975 | Nohtomi |
| 3,914,359 A | 10/1975 | Bevan |
| 3,931,428 A | 1/1976 | Reick |
| 3,961,108 A | 6/1976 | Rosner et al. |
| 3,975,483 A | 8/1976 | Rudloff |
| 4,035,215 A | 7/1977 | Goldstone |
| 4,052,739 A | 10/1977 | Wada et al. |
| 4,093,766 A | 6/1978 | Scher et al. |
| 4,131,705 A | 12/1978 | Kubinsky |
| 4,255,480 A | 3/1981 | Scher |
| 4,313,857 A | 2/1982 | Blount |
| 4,337,290 A | 6/1982 | Kelly et al. |
| 4,400,705 A | 8/1983 | Horike |
| 4,420,525 A | 12/1983 | Parks |
| 4,430,375 A | 2/1984 | Scher et al. |
| 4,474,920 A | 10/1984 | Kyminas et al. |
| 4,890,656 A | 1/1990 | Ohsumi et al. |
| 5,034,272 A | 7/1991 | Lindgren et al. |
| 5,134,026 A | 7/1992 | Melcher |
| 5,206,066 A | 4/1993 | Horacek |
| 5,246,765 A | 9/1993 | Lussi et al. |
| 5,258,216 A | 11/1993 | Von Bonin et al. |
| 5,266,384 A | 11/1993 | O'Dell |
| 5,314,554 A | 5/1994 | Owens |
| 5,405,681 A | 4/1995 | Nakayama et al. |
| 5,405,705 A | 4/1995 | Fujimoto et al. |
| 5,422,170 A | 6/1995 | Iwata et al. |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,635,548 A * | 6/1997 | Kittle .................... C09D 5/033<br>524/904 |
| 5,670,237 A | 9/1997 | Shultz et al. |
| 5,766,522 A | 6/1998 | Daly et al. |
| 5,827,788 A | 10/1998 | Miyakoshi |
| 5,855,832 A | 1/1999 | Clausi |
| 5,865,003 A | 2/1999 | Klett |
| 5,891,564 A | 4/1999 | Schultz et al. |
| 5,925,296 A | 7/1999 | Leese |
| 5,942,072 A | 8/1999 | McKinnon |
| 6,036,137 A | 3/2000 | Myren |
| 6,103,377 A | 8/2000 | Clausi |
| 6,238,750 B1 | 5/2001 | Correll et al. |
| 6,324,809 B1 | 12/2001 | Nelson |
| 6,403,857 B1 | 6/2002 | Gross et al. |
| 6,433,099 B1 * | 8/2002 | Nicholl .................. C08G 59/42<br>525/934 |
| 6,468,645 B1 | 10/2002 | Clausi |
| 6,521,326 B1 | 2/2003 | Fischer et al. |
| 6,537,610 B1 | 3/2003 | Springer et al. |
| 6,617,009 B1 | 9/2003 | Chen et al. |
| 6,620,349 B1 | 9/2003 | Lopez |
| 6,652,695 B1 | 11/2003 | Von Der Heide et al. |
| 6,666,951 B1 | 12/2003 | Kostiw |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Schuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,973,270 B2 | 3/2015 | Siebert et al. |
| 8,993,049 B2 | 3/2015 | Pervan |
| 9,085,905 B2 | 7/2015 | Persson et al. |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,573,343 B2 | 2/2017 | Pervan |
| 9,738,095 B2 | 8/2017 | Pervan |
| 9,757,928 B2 | 9/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,307,984 B2 | 6/2019 | Pervan |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |

(56) References Cited

U.S. PATENT DOCUMENTS

| | | |
|---|---|---|
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,967,608 B2 | 4/2021 | Pervan |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 2001/0006704 A1 | 7/2001 | Chen et al. |
| 2001/0009309 A1 | 7/2001 | Taguchi et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0021915 A1 | 1/2003 | Rohatgi et al. |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0119987 A1 | 6/2003 | Eadara et al. |
| 2003/0129361 A1 | 7/2003 | Plug |
| 2003/0150359 A1* | 8/2003 | Lassmann ............ C09D 5/032 106/404 |
| 2003/0208980 A1 | 11/2003 | Miller et al. |
| 2003/0233809 A1 | 12/2003 | Pervan |
| 2004/0086678 A1 | 5/2004 | Chen et al. |
| 2004/0123542 A1 | 7/2004 | Grafenauer |
| 2004/0169710 A1 | 9/2004 | Ide |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0247831 A1 | 12/2004 | Nakagawa |
| 2004/0250911 A1 | 12/2004 | Vogel |
| 2005/0003099 A1 | 1/2005 | Quist |
| 2005/0079780 A1 | 4/2005 | Rowe et al. |
| 2005/0093194 A1 | 5/2005 | Oriakhi |
| 2005/0193677 A1 | 9/2005 | Vogel |
| 2005/0249929 A1 | 11/2005 | Reichwein et al. |
| 2005/0250879 A1 | 11/2005 | Correll et al. |
| 2005/0252130 A1 | 11/2005 | Martensson |
| 2006/0005498 A1 | 1/2006 | Sabater et al. |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0142433 A1 | 6/2006 | Rivers et al. |
| 2006/0145384 A1 | 7/2006 | Singer |
| 2006/0156672 A1 | 7/2006 | Laurent et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0159814 A1 | 7/2007 | Jacobsson |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0243359 A1 | 10/2007 | Petersen |
| 2007/0256804 A1 | 11/2007 | Garcis Espino et al. |
| 2007/0295446 A1 | 12/2007 | Behr et al. |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0176039 A1 | 7/2008 | Chen et al. |
| 2008/0263985 A1 | 10/2008 | Hasch et al. |
| 2009/0012213 A1 | 1/2009 | Schmaucks et al. |
| 2009/0031662 A1 | 2/2009 | Chen et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0139170 A1 | 6/2009 | Thiers |
| 2009/0145066 A1 | 6/2009 | Pervan |
| 2009/0155612 A1 | 6/2009 | Pervan et al. |
| 2009/0162638 A1 | 6/2009 | Buri et al. |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0066121 A1 | 3/2010 | Gross |
| 2010/0092731 A1 | 4/2010 | Pervan et al. |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0307675 A1 | 12/2010 | Buhlmann |
| 2010/0307677 A1 | 12/2010 | Buhlmann |
| 2010/0310893 A1 | 12/2010 | Derbyshire |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0189471 A1 | 8/2011 | Ziegler |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0283642 A1 | 11/2011 | Meirlaen et al. |
| 2011/0283650 A1 | 11/2011 | Pervan et al. |
| 2011/0293823 A1 | 12/2011 | Bruderer et al. |
| 2011/0293906 A1 | 12/2011 | Jacobsson |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0288689 A1 | 11/2012 | Hansson et al. |
| 2012/0308774 A1 | 12/2012 | Håkansson et al. |
| 2013/0065072 A1 | 3/2013 | Pervan |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0017452 A1 | 1/2014 | Pervan |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199513 A1 | 7/2014 | Pervan et al. |
| 2014/0199558 A1 | 7/2014 | Pervan et al. |
| 2014/0234531 A1 | 8/2014 | Ziegler et al. |
| 2014/0255670 A1 | 9/2014 | Kalwa |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2015/0343739 A1 | 12/2015 | Pervan |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0303868 A1 | 10/2016 | Hansson et al. |
| 2016/0368180 A1 | 12/2016 | Ziegler et al. |
| 2016/0369507 A1 | 12/2016 | Pervan |
| 2016/0375674 A1 | 12/2016 | Schulte |
| 2017/0120558 A1 | 5/2017 | Pervan |
| 2017/0120564 A1 | 5/2017 | Schulte |
| 2017/0165936 A1 | 6/2017 | Schulte |
| 2017/0190156 A1 | 7/2017 | Lundblad et al. |

(56) References Cited

U.S. PATENT DOCUMENTS

| | | |
|---|---|---|
| 2017/0232761 A1 | 8/2017 | Pervan et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0248108 A1 | 8/2019 | Pervan |
| 2019/0277039 A1 | 9/2019 | Persson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0101310 A1 | 4/2021 | Lindgren et al. |
| 2021/0129485 A1 | 5/2021 | Pervan |
| 2021/0197534 A1 | 7/2021 | Ziegler et al. |

FOREIGN PATENT DOCUMENTS

| | | | |
|---|---|---|---|
| CA | 2 852 656 A1 | 4/2013 | |
| CH | 298894 A | 5/1954 | |
| CN | 1706891 A | 12/2005 | |
| CN | 100999610 A | * 7/2007 | |
| CN | 101466799 A | 6/2009 | |
| CN | 105873761 A | 8/2016 | |
| DE | 1 815 312 A1 | 7/1969 | |
| DE | 7148789 U | 4/1972 | |
| DE | 29 39 828 A1 | 4/1981 | |
| DE | 33 34 921 A1 | 4/1985 | |
| DE | 42 36 266 A1 | 5/1993 | |
| DE | 101 56 956 A1 | 6/2003 | |
| DE | 202 14 532 U1 | 2/2004 | |
| DE | 103 31 657 A1 | 2/2005 | |
| DE | 20 2006 007 797 U1 | 8/2006 | |
| DE | 10 2005 046 264 A1 | 4/2007 | |
| DE | 10 2006 024 593 A1 | 12/2007 | |
| DE | 10 2007 046 532 B3 | 10/2008 | |
| DE | 102009018488 A1 | * 10/2010 | ............. B27N 7/005 |
| DE | 10 2010 045 266 A | 3/2012 | |
| EP | 0 129 430 A2 | 12/1984 | |
| EP | 0 129 430 B1 | 1/1990 | |
| EP | 0 355 829 A2 | 2/1990 | |
| EP | 0 611 408 A1 | 12/1993 | |
| EP | 0 592 013 A2 | 4/1994 | |
| EP | 0 611 408 B1 | 9/1996 | |
| EP | 0 732 449 A1 | 9/1996 | |
| EP | 0 744 477 A2 | 11/1996 | |
| EP | 0 914 914 A2 | 5/1999 | |
| EP | 0 732 449 B1 | 8/1999 | |
| EP | 0 744 477 B1 | 1/2000 | |
| EP | 1 035 255 A1 | 9/2000 | |
| EP | 1 125 971 A1 | 8/2001 | |
| EP | 1 136 251 A2 | 9/2001 | |
| EP | 1 193 288 A2 | 4/2002 | |
| EP | 1 209 199 A1 | 5/2002 | |
| EP | 1 249 322 A1 | 10/2002 | |
| EP | 1 242 702 B1 | 11/2004 | |
| EP | 1 498 241 A2 | 1/2005 | |
| EP | 1593717 A2 | 11/2005 | |
| EP | 1 681 103 A2 | 7/2006 | |
| EP | 1 749 676 A1 | 2/2007 | |
| EP | 1 847 385 A1 | 10/2007 | |
| EP | 1 961 556 A1 | 8/2008 | |
| EP | 1 997 623 A1 | 12/2008 | |
| EP | 2 025 484 A1 | 2/2009 | |
| EP | 1 454 763 B1 | 8/2009 | |
| EP | 2 106 903 A1 | 10/2009 | |
| EP | 2 246 500 A2 | 11/2010 | |
| EP | 2 264 259 A2 | 12/2010 | |
| EP | 2 272 667 A1 | 1/2011 | |
| EP | 2 272 668 A1 | 1/2011 | |
| EP | 2 305 462 A1 | 4/2011 | |
| EP | 1 847 385 B1 | 9/2011 | |
| GB | 984 170 A | 2/1965 | |
| GB | 1090450 | 11/1967 | |
| GB | 2 248 246 A | 4/1992 | |
| JP | H02-229002 A | 9/1990 | |
| JP | H11-291203 A | 10/1999 | |
| JP | 2001-287208 A | 10/2001 | |
| JP | 2002-001748 A | 1/2002 | |
| JP | 2003-311717 A | 11/2003 | |
| JP | 2003-311718 A | 11/2003 | |
| JP | 2005-034815 A | 2/2005 | |
| JP | 2005-074682 A | 3/2005 | |
| JP | 2005-170016 A | 6/2005 | |
| JP | 2005-219215 A | 8/2005 | |
| JP | 3705482 B2 | 10/2005 | |
| JP | 2005-307582 A | 11/2005 | |
| JP | 2007-216692 A | 8/2007 | |
| JP | 2007-268843 A | 10/2007 | |
| JP | 2008-188826 A | 8/2008 | |
| NZ | 225556 A1 | 2/1992 | |
| SE | 469 326 B | 6/1993 | |
| WO | WO 92/06832 A1 | 4/1992 | |
| WO | WO 94/00280 A1 | 1/1994 | |
| WO | WO 95/06568 A1 | 3/1995 | |
| WO | WO 00/22225 A1 | 4/2000 | |
| WO | WO 00/44576 A1 | 8/2000 | |
| WO | WO 01/48333 A1 | 7/2001 | |
| WO | WO 01/64408 A1 | 9/2001 | |
| WO | WO 01/68367 A1 | 9/2001 | |
| WO | WO 01/74605 A2 | 10/2001 | |
| WO | WO 01/92037 A2 | 12/2001 | |
| WO | WO 02/42167 A2 | 5/2002 | |
| WO | WO 02/42373 A1 | 5/2002 | |
| WO | WO 03/078761 A1 | 9/2003 | |
| WO | WO 2004/042168 A1 | 5/2004 | |
| WO | WO 2004/050359 A1 | 6/2004 | |
| WO | WO 2004/067874 A2 | 8/2004 | |
| WO | WO 2005/010296 A1 | 2/2005 | |
| WO | WO 2005/054600 A1 | 6/2005 | |
| WO | WO 2005/066431 A2 | 7/2005 | |
| WO | WO 2005/097874 A2 | 10/2005 | |
| WO | WO 2005/116337 A1 | 12/2005 | |
| WO | WO 2005/116361 A1 | 12/2005 | |
| WO | WO 2006/007413 A1 | 1/2006 | |
| WO | WO 2006/013469 A1 | 2/2006 | |
| WO | WO 2006/043893 A1 | 4/2006 | |
| WO | WO 2006/126930 A1 | 11/2006 | |
| WO | WO 2007/015669 A2 | 2/2007 | |
| WO | WO 2007/042258 A1 | 4/2007 | |
| WO | WO 2007/059294 A2 | 5/2007 | |
| WO | WO 2008/004960 A2 | 1/2008 | |
| WO | WO 2008/148771 A1 | 12/2008 | |
| WO | WO 2009/065768 A1 | 5/2009 | |
| WO | WO 2009/065769 A2 | 5/2009 | |
| WO | WO 2009/080772 A1 | 7/2009 | |
| WO | WO 2009/080813 A1 | 7/2009 | |
| WO | WO 2009/116926 A1 | 9/2009 | |
| WO | WO 2009/124704 A1 | 10/2009 | |
| WO | WO 2009/135323 A1 | 11/2009 | |
| WO | WO 2010/087752 A1 | 8/2010 | |
| WO | WO 2010/094500 A1 | 8/2010 | |
| WO | WO 2011/129757 A1 | 10/2011 | |
| WO | WO 2011/141851 A2 | 11/2011 | |
| WO | WO 2012/004699 A2 | 1/2012 | |
| WO | WO 2012/018934 A1 | 2/2012 | |
| WO | WO 2012/031922 A1 | 3/2012 | |

(56) References Cited

FOREIGN PATENT DOCUMENTS

| WO | WO 2012/037950 A1 | 3/2012 |
|---|---|---|
| WO | WO 2013/056745 A1 | 4/2013 |

OTHER PUBLICATIONS

Murphy, Chapter 7—Modifying Specific Properties: Appearance—Black and White Pigmentation, Editor(s): John Murphy, Additives for Plastics Handbook (Second Edition), Elsevier Science, 2001, pp. 73-92, ISBN 9781856173704, https://doi.org/10.1016/B978-185617370-4/50009-9. (Year: 2001).*
Machine translation of CN-100999610-A, published Jul. 2007, Powered by EPO and Google. (Year: 2007).*
Machine translation of DE-102009018488-A1, published Oct. 2010, Powered by EPO and Google. (Year: 2010).*
Yang, Dry particle coating for improving the flowability of cohesive powders, 2005, Powder Technology 158, pp. 21-33. (Year: 2005).*
Castellanos, Flow Regimes in Fine Cohesive Powders, 1999, Physical Review Letters, vol. 82, No. 6, pp. 1156-1159. (Year: 1999).*
U.S. Appl. No. 14/321,288, filed Jul. 1, 2014, Kent Lindgren, Hans Persson and Göran Ziegler of Göran Ziegler (cited herein as US Patent Publication No. 2051/0017461 A1 of Jan. 15, 2015).
U.S. Appl. No. 14/563,167, filed Dec. 8, 2014, Göran Ziegler and Kent Lindgren (cited herein as US Patent Application Publication No. 2015/0093502 A2 of Apr. 2, 2015).
U.S. Appl. No. 14/980,638, filed Dec. 28, 2015, Darko Pervan, Jan Jacobsson, Kent Lindgren, Göran Ziegler, Niclas Håkansson and Eddy Boucké (cited herein as US Patent Application No. 2016/0114495 A1 of Apr. 28, 2016).
U.S. Appl. No. 15/162,868, filed May 24, 2016, Göran Ziegler, Marcus Bergelin, Jan Jacobsson, and Melker Ryberg (cited herein as US Patent Application No. 2016/0368180 A1 of Dec. 22, 2016).
U.S. Appl. No. 15/704,634, filed Sep. 14, 2017, Darko Pervan, Kent Lindgren, Jan Jacobsson, Eddy Boucké, Göran Ziegler and Nicklas Håkansson (cited herein as US Patent Application No. 2018/0002934 A1 of Jan. 4, 2018).
U.S. Appl. No. 16/433,722, filed Jun. 6, 2019, Darko Pervan, (cited herein as US Patent Application No. 2019/0284821 A1 of Jun. 6, 2019).
U.S. Appl. No. 16/439,037, filed Jun. 12, 2019, Darko Pervan, Kent Lindgren, Jan Jacobsson, Eddy Boucké, Göran Ziegler and Nicklas Håkansson (cited herein as US Patent Application No. 2019/0292796 A1 of Sep. 26, 2019).
International Search and Written Opinion issued in PCT/SE2020/050010, mailed Mar. 27, 2020, Patent-och registreringsverket, Stockholm, SE, 10 pages.
Abdullah, E.C., et al., "Cohesiveness and Flowability Properties of Silica Gel Powder," *Physics International*, 2010, pp. 16-21, 1 (1), ISSN 1948-9803, Science Publications.
BTLSR Toledo, Inc. website. http://www.btlresins.com/more.html. "Advantages to Using Powdered Resins," May 26, 2007, 2 pages, per the Internet Archive WayBackMachine.
Floor Daily, "Shaw Laminates: Green by Design," Aug. 13, 2007, 1 pg, Dalton, GA.
"Hex Netting—Fencing—Ace Hardware," from http://www.acehardware.com/family/index.jsp?categoryId=1260278, archived on Nov. 1, 2009, accessed through the Internet Archive, WaybackMachine, 3 pages.
Le Fur, X., et al., "Recycling melamine-impregnated paper waste as board adhesives," published online Oct. 26, 2004, pp. 419-423, vol. 62, Springer-Verlag, DE, XP055332791.
Mortensen, A., Editor, "Wood-Plastic Composites", *Concise Encyclopedia of Composite Materials,* Second Edition, 2007, 7 pages, including pp. 932-936, Elsevier, Ltd. , NL, retrieved from the internet: https://app.knovel.com/hotlink/pdf/id:kt00U06FO1/concise-encyclopedia/wood-plastic-composites.
Nimz, H.H., "Wood," Ullmann's Encyclopedia of Industrial Chemistry, published online Jun. 15, 2000, pp. 453-505, vol. 39, Wiley-VCH Verlag Gmbh & Co. KgaA, Weinheim, DE.
Odian, George, "Principles of Polymerization," 1991, $3^{rd}$ Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
U.S. Appl. No. 17/125,199, filed Dec. 17, 2020, Kent Lindgren, Hans Persson and Göran Ziegler.
U.S. Appl. No. 17/125,199, Lindgren et al—See Information Below.
Patt, Rudolf, "Paper and Pulp," in *Ullmann's Encyclopedia of Industrial Chemistry,* published online 2000, 157 pages, Wiley-VCH Verlag Gmbh & Co., KGaA, Weinheim, DE.
U.S. Appl. No. 17/125,199, filed Dec. 17, 2020, Kent Lindgren.
U.S. Appl. No. 18/189,324, filed Mar. 24, 2023, Göran Ziegler.
Rejection Decision mailed on Nov. 20, 2023, by the China National Intellectual Property Administration in Chinese Patent Application No. 202080007885.1 (13 pages).
International Preliminary Report on Patentability received for PCT Patent Application No. PCT/SE2020/050010, mailed on Jul. 22, 2021, 7 pages.
Office Action received for Chinese Patent Application No. 202080007885, mailed on Sep. 5, 2022, 17 pages (9 pages of English Translation and 8 pages of Original Document).
Supplementary European Search Report and Search Opinion received for EP Application No. 20738808, mailed on Sep. 2, 2022, 6 pages.
U.S. Appl. No. 18/788,354, filed Jul. 30, 2024, Kent Lindgren.

* cited by examiner

METHOD OF MANUFACTURING A BUILDING ELEMENT AND A BUILDING ELEMENT

CROSS REFERENCE TO RELATED APPLICATIONS

The present application claims the benefit of Swedish Application No. 1950022-2, filed on Jan. 10, 2019. The entire contents of Swedish Application No. 1950022-2 are hereby incorporated herein by reference in their entirety.

TECHNICAL FIELD

Embodiments of the present invention relate to a method of manufacturing a building element and a building element.

TECHNICAL BACKGROUND

Floor coverings having a wooden surface may be of several different types. Solid wood flooring is formed of a solid piece of wood in form of a plank. Engineered wood flooring is formed of a surface layer of wood glued to a core. The core may be a lamella core or a wood-based panel such as plywood, MDF or HDF. The wooden surface layer may as an example have a thickness of 2-10 mm.

A wooden floor covering may also be formed by gluing a wood veneer to a substrate, for example, a wood-based panel such as particleboard, MDF or HDF. Wood veneer is a thin wood layer, for example having a thickness of 0.2-1 mm. A flooring with a separate surface layer glued to a core of for example HDF or plywood is more moisture stable than solid wood floorings.

Compared to solid wood and engineered wood floorings, wood veneer floorings can be produced to a lower cost since only a thin wood layer is used.

A new type of floors has recently been developed with a solid surface comprising a substantially homogenous mix of wood particles, a binder and wear resistant particles. Such floor and building panels are marketed under the trademark NADURA®.

The panels are produced according to a production method wherein the mix comprising wood powder, binder such as melamine formaldehyde and optionally, wear resistant particles is applied in powder form on a core. Such a method is disclosed in WO 2009/065769. A method of controlling a loss on cure in such a method is disclosed in US 2012/0263878.

The mix is scattered in dry powder form on a wood based core, such as for example HDF. It has been shown that wood powder has quite low flowability through low stress environments, such as discharge from big bags, air conveying and scattering. For example, it is difficult to scatter wood powder evenly across a substrate without obtaining naked areas with no wood powder present, areas with less powder, or areas with an increased amount of powder applied. The reason is that wood powder is bridge building and ratholing in low stress processes. By ratholing is meant emptying of material only in the centre of a hopper or silo, thus leaving circumferential material.

These two behaviours are due to the particle texture, shape and density, which for wood powder all increase the risk of mechanical interlocking, bridging or ratholing as a result. The wood powder particles or fibres are rough with kinks and fibrils, are fibrous and thereby far from spherical and the particles are not dense enough to induce bridge breaking gravitational forces.

The binder, which is the other main component of the mix, usually comprises more free flowing particles, at least compared to the wood powder After the mix has been applied on the core, the mix is thereafter cured under heat and pressure to a 0.1-1.0 mm thick surface layer arranged on the core. When curing the melamine formaldehyde resin, shrinking of the melamine formaldehyde resin leads to tension in the layer. The internal stress formed in the layer may cause warping of the panel. The tension at the front side of the panel must be compensated by a counteractive tension at the rear side of the panel. Therefore, typically a balancing layer is arranged on a rear side of the core opposite the layer. The balancing layer is adapted to balance shrinking and expansion caused by both pressing, cooling and climate changes. The balancing layer may be a resin impregnated paper or a powder formed of a mix comprising wood powder and a thermosetting binder.

US 2005/0250879 relates to powder coating films formed by melting or flowing powder coating particles into a cohesive layer, followed by curing the components to form a continuous film. Powder compositions comprising mixtures of ingredients as unassociated discrete particles in a raw mix having an average particle size ranging from 1 to 25 µm. The raw mix comprises one film-forming (co)polymer or resin.

SUMMARY

It is an object of at least some embodiments of the present invention to provide an improvement over the above described techniques and known art.

A further object of at least some embodiments of the present invention is to optimize a process of producing the building element.

A further object of at least some embodiments of the present invention is to make the process more cost efficient, and consequently reduce the costs of the building element while preserving good quality.

A further object of at least some embodiments of the present invention is to apply a layer having a uniform thickness.

A further object of at least some embodiments of the present invention is to improve the shape of the building element.

At least some of these and other objects and advantages that will be apparent from the description have been achieved by at least some aspects disclosed herein below.

In a first aspect it is disclosed a method of manufacturing a building element, comprising applying a first layer on a first surface of a substrate, the first layer comprising a mixture of a binder, at least one filler and cohesive particles, and applying heat and/or pressure to the first layer and/or substrate, thereby forming the building element.

The cohesive particles may be fine cohesive particles. Fine particles may be defined as at least 70% of the particles having a length in their largest dimension of 2.5 µm or less, such as a length in their largest dimension between 0.1 µm and 2.5 µm.

An amount of the cohesive particles in the mixture may be between 0.05 wt % and 9 wt %.

The cohesive particles may be non-pigment cohesive particles. By non-pigment cohesive particles may be meant particles not being conventional pigments, such as such as titanium pigments, carbon black, iron oxide pigments, copper pigments, etc. An example of a conventionally used titanium pigment is titanium dioxide. The non-pigment cohesive particles may be particles having a low capacity of changing the colour of reflecting, absorbing or transmitting light as a result of wavelength selective absorption. Consequently, cohesive particles are not conventionally used in the meaning of pigment in the industry. Conventional pigments may have a size of less than 500 nm. Reflecting pigments, such as white pigments, have a comparably larger size (such as 300-400 nm) than absorbing pigments.

The cohesive particles may be fine non-pigment cohesive particles.

It shall be understood that cohesive particles are particles having cohesive attraction or cohesive force. Cohesive force is the action or property or like of particles sticking together, being mutually attractive. It is an intrinsic property of a substance that is caused by the shape and structure of at least one particle, creating electrical attraction that can maintain a microscopic structure. In other words, cohesion allows for surface energy reduction by creating a bulk-like atmosphere for the particle surface molecules.

An advantage of the first aspect is that the fine cohesive particles tend to coat fillers such as wood powder including wood fibres or wood particles, filling the holes, pores, kinks and fibrils, due to their cohesive properties. Thereby, the cohesive particles make the wood particles smoother and less prone to mechanically interlocking. Consequently, the risk for bridging and/or ratholing as explained above is at least reduced.

When bridging and/or ratholing is reduced, the risk for uneven application of the mixture on the substrate is at least reduced. Thereby, the first layer may have a uniform thickness throughout its extension. A uniform thickness is desirable aesthetically, but also due to balancing of the first layer. If the first layer has a uniform thickness, the forces required from the balancing layer to counteract the forces formed from the first layer during and/after curing will be reduced. Thereby, the amount of binder in the balancing layer can be reduced.

The cohesive particles normally exhibit poor flowability due to their high cohesive behaviour. Fillers, such as wood powder, exhibit poor flowability due to high risk for mechanical interlocking. However, it has been surprisingly been discovered, and shown herein, that the two different properties can be balanced in order to surprisingly increase flowability by a certain concentration of cohesive particles in the mixture. If the amount of cohesive particles in the mixture is too low, the mechanical interlocking properties of the wood powder will dominate, resulting in low flowability. If the amount of cohesive particles in the mixture is too high, the cohesive properties of the cohesive particles will dominate, resulting in low flowability. The amount of cohesive particles should be balanced in order to improve flowability. The amount of the fine non-pigment cohesive particles in the mixture may be between 0.05 wt % and 9 wt % of the mixture.

An advantage is that the heat and/pressure treated first layer has essentially the same thickness throughout its entire extension, preferably both in its longitudinal and its transverse extension.

An advantage of the increased flowability is that the mixture is more evenly distributed over the substrate.

A cohesion force of said cohesive particles, such as fine non-pigment cohesive particles, may be exceeding a cohesive force of said at least one filler. Thereby, the cohesive particles tend to coat the fillers.

A cohesion force of said cohesive particles, such as fine non-pigment cohesive particles, may be at least 0.25 kPa, such as 0.25 to 3 kPa, as measured with standard Shear Cell Program, 50 mm shear 6 kPa (FT4 Powder Rheometer). Standard Shear Cell Program is a standard program for a Freeman Technology FT4 Powder Rheometer. When using wood powder as a filler, the cohesion force of wood powder comprising wood fibre is measured to be 0.25 kPa when measured with said standard Shear Cell Program.

The mixture may be provided in dry form.

The mixture may be applied on the substrate in a dry form.

The mixture may be a dry powder.

An amount of cohesive particles, such as fine non-pigment cohesive particles, in the mixture may be between 0.2 wt % and 4.5 wt %.

An amount of cohesive particles, such as fine non-pigment cohesive particles, in the mixture may be between 0.5 wt % and 5 wt %, such as between 2 wt % and 4 wt %.

At least 70% of the cohesive particles, such as fine non-pigment cohesive particles, may have a length in their largest dimension of 2.5 µm or less, preferably a length in their largest dimension between 0.1 µm and 2.5 µm.

The cohesive particles, such as fine non-pigment cohesive particles, may have a length in their largest dimension of 2.5 µm or less, preferably a length in their largest dimension between 0.1 µm and 2.5 µm.

The cohesive particles, such as fine non-pigment cohesive particles, may have a refractive index (RI) of less than 1.9.

The cohesive particles, such as fine non-pigment cohesive particles, may be selected from silicates, such as aluminium silicate or silicon oxides, such as $SiO_2$.

$SiO_2$ may be provided as fumed silica.

The cohesive particles, such as fine non-pigment cohesive particles, may be calcium carbonate.

The cohesive particles, such as fine non-pigment cohesive particles, may be barium sulphate.

The cohesive particles, such as fine non-pigment cohesive particles, may be polytetrafluoroethylene.

Said at least one filler may be or comprise fibres.

Said at least one filler may comprise wood powder. The wood powder may comprise wood fibres or wood particles. The wood fibre particle size may be 0-300 µm, such as 0-150 µm. The wood fibre particle size may be 10-300 µm, such as 10-150 µm.

The binder may be a thermosetting binder or a thermoplastic binder.

The binder may be urea formaldehyde resin, a mixture comprising urea formaldehyde resin, or a co-polymer comprising urea formaldehyde resin, phenol formaldehyde resin, a mixture comprising phenol formaldehyde resin, or a co-polymer comprising phenol formaldehyde resin, melamine formaldehyde resin, a mixture comprising melamine formaldehyde resin, or a co-polymer comprising melamine formaldehyde resin or mixture thereof.

The first layer may further comprise wear resistant particles.

The first layer may further comprise pigment particles.

The substrate may be selected from a wood-based board, a particleboard, a thermoplastic board, a plywood, a lamella core, a veneer layer.

The first layer may be permanently attached to the substrate, thereby forming a building panel.

The building panel may be a floor panel or wall panel.

The method may further comprise applying a surface layer, as a second layer, on top of the first layer.

The method may further comprise applying a balancing layer on a second surface of a substrate, the second surface being opposite to the first surface of the substrate.

In a second aspect, a building element is provided. The building element comprises a first layer arranged on a substrate, the first layer formed by a mixture comprising a binder, at least one filler and cohesive particles, wherein said building element is formed by applying heat and/or pressure.

The building element may be cured by applying heat and/or pressure.

The cohesive particles may be fine cohesive particles. Fine particles may be defined as at least 70% of the particles having a length in their largest dimension of 2.5 µm or less, such a length in their largest dimension between 0.1 µm and 2.5 µm.

An amount of the cohesive particles in the mixture may be between 0.05 wt % and 9 wt %.

The cohesive particles may be non-pigment cohesive particles. By non-pigment cohesive particles may be meant particles not being conventional pigments, such as such as titanium pigments, carbon black, iron oxide pigments, copper pigments, etc. An example of a conventionally used titanium pigment is titanium dioxide. The non-pigment cohesive particles may be particles having a low capacity of changing the colour of reflecting, absorbing or transmitting light as a result of wavelength selective absorption. Consequently, cohesive particles are not conventionally used in the meaning of pigment in the industry. Conventional pigments may have a size of less than 500 nm. Reflecting pigments, such as white pigments, have a comparably larger size (such as 300-400 nm) than absorbing pigments.

The cohesive particles may be fine non-pigment cohesive particles.

It shall be understood that cohesive particles are particles having cohesive attraction or cohesive force. Cohesive force is the action or property or like of particles sticking together, being mutually attractive. It is an intrinsic property of a substance that is caused by the shape and structure of at least one particle, creating electrical attraction that can maintain a microscopic structure. In other words, cohesion allows for surface energy reduction by creating a bulk-like atmosphere for the particle surface molecules.

The second aspect incorporates all the advantages of the first aspect, which previously has been discussed, whereby the previous discussion is applicable also to the building element.

A cohesion force of said cohesive particles, such as fine non-pigment cohesive particles, may be exceeding a cohesive force of said at least filler.

A cohesion force of said cohesive particles, such as fine non-pigment cohesive particles, may be at least 0.25 kPa, such as 0.25 to 3 kPa, as measured with standard Shear Cell Program, 50 mm shear 6 kPa (FT4 Powder Rheometer. Standard Shear Cell Program is a standard program for a Freeman Technology FT4 Powder Rheometer.

The mixture may be provided in dry form.

The mixture may be applied on the substrate in a dry form.

The mixture may be a dry powder.

An amount of cohesive particles, such as fine non-pigment cohesive particles, in the mixture may be between 0.2 wt % and 4.5 wt %.

An amount of cohesive particles, such as fine non-pigment cohesive particles, in the mixture may be between 0.5 wt % and 5 wt %, such as between 2 wt % and 4 wt %.

At least 70% of the cohesive particles, such as fine non-pigment cohesive particles, may have a length in their largest dimension of 2.5 µm or less, preferably a length in their largest dimension between 0.1 µm and 2.5 µm.

The cohesive particles, such as fine non-pigment cohesive particles, may have a length in their largest dimension of 2.5 µm or less, preferably a length in their largest dimension between 0.1 µm and 2.5 µm.

The cohesive particles, such as fine non-pigment cohesive particles, may have a refractive index (RI) of less than 1.9.

The cohesive particles, such as fine non-pigment cohesive particles, may be selected from silicates, such as aluminium silicate or silicon oxides, such as $SiO_2$.

$SiO_2$ may be provided as fumed silica.

The cohesive particles, such as fine non-pigment cohesive particles, may be calcium carbonate.

The cohesive particles, such as fine non-pigment cohesive particles, may be barium sulphate.

The cohesive particles, such as fine non-pigment cohesive particles, may be polytetrafluoroethylene.

Said at least one filler may comprise wood powder. The wood powder may comprise wood fibres or wood particles.

The binder may be a thermosetting binder or a thermoplastic binder.

The binder may be urea formaldehyde resin, a mixture comprising urea formaldehyde resin, or a co-polymer comprising urea formaldehyde resin, phenol formaldehyde resin, a mixture comprising phenol formaldehyde resin, or a co-polymer comprising phenol formaldehyde resin, melamine formaldehyde resin, a mixture comprising melamine formaldehyde resin, or a co-polymer comprising melamine formaldehyde resin or mixture thereof.

The first layer may further comprise wear resistant particles.

The first layer may further comprise pigment particles.

The substrate may be selected from a wood-based board, a particleboard, a thermoplastic board, a plywood, a lamella core, a veneer layer.

The first layer may be permanently attached to the substrate, thereby forming a building panel.

The building panel may be a floor panel or wall panel.

The building panel may further comprise a surface layer, as a second layer, on top of the first layer.

The building panel may further comprise a balancing layer arranged on a second surface of a substrate, the second surface being opposite to the first surface of the substrate.

BRIEF DESCRIPTION OF THE DRAWINGS

Embodiments of the present invention will by way of example be described in more detail with reference to the appended schematic drawings, which show embodiments of the present invention.

DETAILED DESCRIPTION

It is disclosed herein a method of manufacturing a building element 10, comprising applying a first layer 1 on a first surface of a substrate 2, the first layer 1 comprising a mixture of a binder, at least one filler and cohesive particles 4, applying heat and/or pressure to the first layer and/or the substrate thereby forming the building element 10.

The method of manufacturing the building element 10, and the building element 10 thereby formed, will now be described with reference to FIGS. 1A-D.

The building element 10 may be a building panel, such as floor panel, a ceiling panel, a wall panel, a door panel, a worktop, a furniture component or part of a furniture component, skirting boards, mouldings, edging profiles etc.

The method comprises providing a substrate 2. The substrate is preferably a pre-fabricated substrate, produced prior to the method of manufacturing a building element 10. A substrate may comprise at least one wood veneer layer. The substrate may comprise several wood veneer layers, such as being plywood. Preferably, the veneered element includes an uneven number of wood veneer layers. The substrate may comprise a wood-based panel. The wood-based panel may be selected from the group comprising of HDF, MDF, OSB, lamella core, and solid wood. The substrate may be a thermoplastic board. The substrate may comprise a thermoplastic material. The substrate may be a mineral composite board. The substrate may be a fibre cement board. The substrate may comprise a sheet such as a paper sheet or sheet of non-woven material or a conveyor. The substrate is preferably a pre-fabricated substrate, produced prior to the method of manufacturing a building element 10. The wood-based substrate may be a wood fibre-based board such as MDF, HDF, particleboard or plywood board. The substrate may be a Wood Plastic Composite (WPC). The substrate may be a mineral composite board. The substrate may be magnesium oxide cement board. The substrate may be a ceramic board. The substrate may be a plastic board such as a thermoplastic board.

The substrate 2 may be a carrier, such as a sheet of paper, a non-woven sheet, or a wood veneer.

When the first layer 1 is permanently attached to the substrate 2 the building element 10 is a building panel. Permanently means that the substrate cannot be detached from the at least a first layer after they are attached to the substrate by applying heat and/or pressure.

When substrate is a temporary carrier, such as a sheet of paper or non-woven sheet or a conveyor, the first layer is reversibly attached to the substrate 10. Reversibly means that the at least a first layer 1 may be detached from the substrate 2 after application of heat and/or pressure.

The substrate 2 has two surfaces. The first surface is facing the first layer 1. The second surface is the surface of the substrate 2 opposite of the first surface. If, optionally, a balancing layer 5 is applied to the substrate, the second surface of the substrate 2 is facing the balancing layer 5.

According to another aspect, the method further comprises applying a balancing layer 5 on a second surface of a substrate 2, the second surface being opposite to the first surface of the substrate 2.

The balancing layer 5 may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder. The balancing layer may have the same composition as the first layer 1.

Figure 1A:
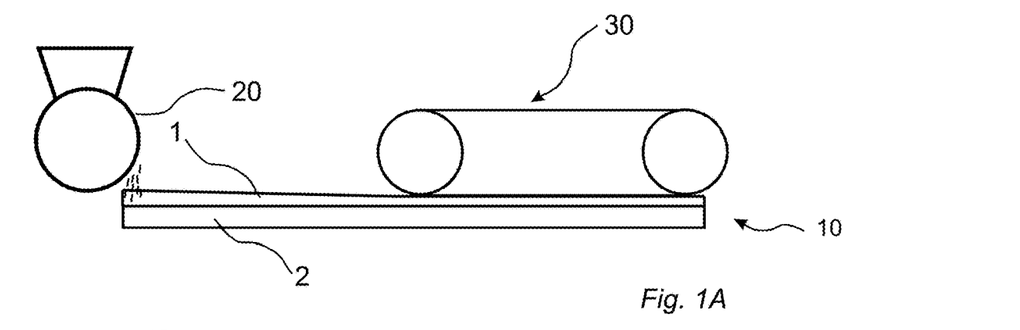
FIG. 1A shows a method of producing a building element.

A first layer 1 is applied on a first surface of the substrate 2. The first layer 1 may be applied by scattering 20, as shown in FIG. 1A.

The first layer 1 is formed by a mixture comprising a binder, at least one filler, and cohesive particles.

The mixture is applied in dry form. The mixture is preferably applied in dry powder form.

Said least one filler may be particles or fibres, for example, wood fibres or particles, or mineral particles or fibres. The wood particles may be lignocellulosic particles and/or cellulosic particles. The wood particles may be at least partially bleached or have the original wood colour. Particles may be also coloured prior to adding them to a mixture. A filler may be rice, straw, corn, jute, linen, flax, cotton, hemp, bamboo particles or fibres. A filler may be metals, ceramic filler, a composite filler, etc.; for example, silicates or silicone oxides.

In the following, particles and fibres will be used as substitutes.

It may be the case that more than one filler is present in a mixture. The mixture may comprise a combination of two or more fillers discussed above.

A binder may be a thermosetting or thermoplastic binder.

The first layer 1 may comprise a thermosetting binder. The thermosetting binder may be an amino resin such as melamine formaldehyde, urea formaldehyde, or a combination thereof. The thermosetting binder may be phenol formaldehyde.

The first layer 1 may comprise a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The thermoplastic binder simultaneously bonds the first surface of the substrate 2 to the first layer 1.

According to another aspect, the first layer 1 may comprise, as a thermosetting binder, a urea formaldehyde resin, urea formaldehyde resin, or a co-polymer comprising urea formaldehyde resin, phenol formaldehyde resin, phenol formaldehyde resin, or a co-polymer comprising phenol formaldehyde resin, melamine formaldehyde resin, melamine formaldehyde resin, or a co-polymer comprising melamine formaldehyde resin or mixtures thereof.

The mixture may further comprise cohesive particles, such as fine non-pigment cohesive particles.

A particle is a powder component with a discrete quantity of matter and with the surface to the immediate surrounding, meaning either a single discrete component or two or more such components bound together chemically or physically by a coupling agent to form one solid unit of greater mass and/or size.

The cohesive particles may be fine cohesive particles.

The cohesive particles may be non-pigment particles, such as fine non-pigment cohesive particles.

The cohesive particles, such as fine non-pigment cohesive particles, may be selected from silicates, silicon oxides, calcium carbonate, barium sulphate, polytetrafluoroethylene.

The cohesive particles, such as fine non-pigment cohesive particles, may be selected from silicates, such as aluminium silicate, magnesium silicate or silicon oxides, preferably $SiO_2$, preferably as fumed silica.

The cohesive particles, such as fine non-pigment cohesive particles, may be selected from calcium carbonate (CaCO3, such as MIKHART C®), barium sulphate such as BaSO4 BB30EX, aluminium silicate such as POLYGLOSS 90®, hydrated magnesium silicate, calcinated aluminium silicate (fired raw kaolin with reduced crystalline water content), polytetrafluoroethylene such as ALGOFLON® and fumed silica such as HDK N20®.

It shall be understood that cohesive particles are particles having cohesive attraction or cohesive force. Cohesive force is the action or property or like of particles sticking together, being mutually attractive. It is an intrinsic property of a substance that is caused by the shape and structure of at least one particle, creating electrical attraction that can maintain a microscopic structure. In other words, cohesion allows for surface energy reduction by creating a bulk-like atmosphere for the particle surface molecules.

By fine particle it is typically understood that at least 70% of the particles have a length in their largest dimension of 2.5 μm or less, preferably that the particles have a length in their largest dimension of 2.5 μm or less.

Fine cohesive particles, such as fine non-pigment cohesive particles, are thus particles wherein at least 70% of the particles having a size, preferably the length in their largest dimension, being between 0.1 μm and 2.5 μm, such that particles having a size, preferably the length in their largest dimension, being between 0.1 μm and 2.5 μm.

A cohesion force of the cohesive particles may exceed a cohesive force of said at least one filler, such that the cohesive particles coat the fillers. The cohesion force of the cohesive particles may be at least 0.25 kPa, such 0.25-3 kPa, as measured with standard Shear Cell Program, 50 mm shear 6 kPa (FT4 Powder Rheometer).

According to an aspect, the cohesive particles, such as fine non-pigment cohesive particles, in the first layer are present in an amount of 0.05 wt % to 9 wt % in the mixture.

Preferably, the amount of cohesive particles, such as fine non-pigment cohesive particles, in the mixture is between 0.3 wt % and 8.5 wt %, preferably between 1 wt % and 7 wt %, preferably between 2 wt % and 6 wt %, preferably between 4 wt % and 5 wt %.

In one embodiment, the amount of non-pigment cohesive particles in the mixture may be about 7.5 wt %.

In one embodiment, the amount of non-pigment cohesive particles in the mixture may be about 2.5 wt %.

In an aspect, the amount of cohesive particles, such as fine non-pigment cohesive particles, in the mixture may be between 0.2 wt % and 4.5 wt %, preferably between 0.2 wt % and 2.5 wt %.

In an aspect, the amount of cohesive particles, such as fine non-pigment cohesive particles, in the mixture may be between 0.3 wt % and 5 wt %, preferably between 0.5 wt % and 5 wt %, more preferably between 2 wt % and 4 wt %.

In one embodiment, the amount of non-pigment cohesive particles in the mixture may be about 0.1 wt %.

According to another aspect, the fine non-pigment cohesive particles are selected from silicates, such as aluminium silicate or silicon oxides, preferably $SiO_2$, preferably as fumed silica.

In particular, if aluminium silicate is used as fine non-pigment cohesive particles, the amount of aluminium silicate in the mixture may be between 0.5 wt % and 9 wt %, such as between 0.5 wt % and 5 wt %, preferably between 2 wt % and 4 wt %. In an aspect, the amount of aluminium silicate in the mixture may be between 0.3 wt % and 5 wt %.

If fumed silica, such as $SiO_2$, is used as fine non-pigment cohesive particles, the amount of silicon oxides in the mixture may be between 0.05 wt % and 3 wt %, preferably between 0.05 wt % and 0.7 wt % such as between 0.1 wt % and 0.7 wt %, preferably between 0.3 wt % and 0.7 wt %.

Preferably, fine non-pigment cohesive particles may be selected from calcium carbonate ($CaCO_3$, such as MIKHART C®), $BaSO_4$ BB30EX, POLYGLOSS 90® (aluminium silicate), hydrated magnesium silicate, calcinated aluminium silicate (fired raw kaolin with reduced crystalline water content), ALGOFLON® (polytetrafluoroethylene) and HDK N20® (fumed silica).

If calcium carbonate is used as fine non-pigment cohesive particles, the amount of calcium carbonate in the mixture may be between 0.3 wt % and 9 wt %, preferably between 0.3 wt % and 5 wt % such as between 0.5 wt % and 5 wt %, preferably between 2 wt % and 4 wt %. In an aspect, the amount of calcium carbonate in the mixture may be between 0.5 wt % and 9 wt %.

If barium sulphate is used as fine non-pigment cohesive particles, the amount of barium sulphate in the mixture may be between 0.3 wt % and 9 wt %, preferably between 0.3 wt % and 5 wt % such as between 0.5 wt % and 5 wt %, preferably between 2 wt % and 4 wt %. In an aspect, the amount of barium sulphate in the mixture may be between 0.5 wt % and 9 wt %.

If polytetrafluoroethylene is used as fine non-pigment cohesive particles, the amount of polytetrafluoroethylene in the mixture may be between 0.3 wt % and 9 wt %, preferably between 0.3 wt % and 5 wt % such as between 0.5 wt % and 5 wt %, preferably between 2 wt % and 4 wt %. In an aspect, the amount of polytetrafluoroethylene in the mixture may be between 0.5 wt % and 9 wt %.

According to another aspect, $SiO_2$ is a fumed silica.

In one aspect, the first layer may further comprise pigment.

In another aspect, the first layer may comprise essentially no pigment.

Preferably, cohesive particles, such as fine non-pigment cohesive particles, have a refractive index (RI) of less than 1.9, such as 1.0-1.9. When refractive index is equal to or below 1.9, the fine non-pigment cohesive particles discolour the first layer less that the particles having refractive index more than 1.9. Thereby, fine non-pigment cohesive particles in accordance with certain embodiments of the invention do not significantly affect certain properties of the first layer, such as colour.

Preferably, cohesive particles such as fine non-pigment cohesive particles have a refractive index of about 1.56, such as the cohesive particles being aluminium silicate.

Preferably, cohesive particles such as fine non-pigment cohesive particles have a refractive index of about 1.46, such as the cohesive particles being fumed silica (such as) AEROSIL®.

The refractive index of cohesive pigment particles is a number that describes how fast light propagates through the material and is defines as:

Refractive Index (RI)=speed of light/phase velocity of the light in the medium. Refractive index can be measured with refractometers, such as OPTi Digital Range refractometers from Bellingham and Stanley.

The dry mixture preferably comprises between 30 wt % to 47 wt % of filler such as wood powder, preferably 33-45 wt %, more preferably 35 wt % or 44 wt %.

The dry mixture preferably comprises between 44 wt % and 70 wt % of at least one binder (or a mixture of binders), such as 49-54 wt %, or 60-75 wt %.

The dry mixture preferably comprises between 0.05 wt % and 9 wt % of cohesive particles, such as fine non-pigment cohesive particles. For example, when aluminium silicate is used, the mixture preferably comprises aluminium silicate in the amount between 2-4 wt %. For example, when fumed silica is used, it is preferably comprised in the dry mixture in the amount 0.2-0.7 wt %.

The mixture may be applied in an amount of 200-600 g/m², preferably 300-500 g/m², such as about 400 g/m² thereby forming a first layer. The amount of binder in the applied mixture may be 100-300 g/m², preferably 150-250 g/m² such as about 200 g/m².

The mixture of a binder, at least one filler and fine non-pigment cohesive particles may be distributed on the first surface of the substrate 2 to form a first layer 1, as shown in FIG. 1A, or may be mixed with further additives, and/or wear resistant particles and/or pigments or dyes to be distributed over the first surface of the substrate 2.

It has been surprisingly discovered by the inventors that fine non-pigment cohesive particles added in the above disclosed ranges to the dry mixture comprising a binder and at least one filler increase free flow of the dry mixture of the first layer.

At the same time addition of such particles to the well-balanced composition had no material negative effect on other properties of the mixture. The process parameters for the production of the building element such as pressure, temperature and time remained largely unchanged.

It has been discovered by the inventors that fine non-pigment cohesive particles are suitable for the purpose and does not materially affect any other parameters of the mixture and the first surface layer in a negative way. Thus, a mixture comprising a binder, at least one filler and fine non-pigment cohesive particles may form a first layer of the building element as defined herein.

Including non-pigment cohesive particles in the mixture improves free flow of the first layer, thereby allowing for a better distribution of the layer. It also improves the attachment of the first layer 1 to the substrate 2 after pressing.

The first layer 1 may also have other properties such as wear-resistant properties, provided by additives such as wear resistant particles. Wear resistant particles may be aluminium oxide particles, such as corundum.

The first layer 1 may comprise further additives such as wetting agents, anti-static agents and/or heat conductive additives such as aluminium, catalysts.

Flowability of the dry mixture positively created by the addition of fine non-pigment cohesive particles that improves curing of a building element when applying heat and/or pressure, since the board coming out of press has an improved shape.

The balancing of the product is thereby improved. A balancing layer 5, if any may be thinner than is conventionally used in the art.

There may be an additional or intermediate layer arranged on the first layer 1 or on the first surface of the substrate 2, not shown on FIGS. 1A-D. The intermediate layer may be, but not limited to a cork layer or cork veneer layer, having sound-absorbing properties.

Moisture may be applied to the first layer 1 prior to pressing 30. The first layer 1 may be dried and or stabilised by applying heat, for example by IR or NIR.

The mixture is applied on the substrate 2 to form the first layer 1 and pressed together by applying heat and/or pressure to the first layer 1 and/or substrate 2, as shown in FIG. 1A. If the first layer 1 includes a thermosetting binder, the first layer 1 is cured by applying heat and/or pressure. Preferably pressure may be applied. Pressure applied may be between 20 to 60 Bar. The pressure may be applied by continuous press or discontinuous press to the first layer. The pressure is preferably between 40 and 60 bars, when the press is discontinuous, or between 20 bar to 60 bar when the press is continuous. A temperature is preferably between 150° C. and 250° C.

A surface layer 3 may optionally be applied on the first layer 1, preferably prior to pressing. The first layer 1 may be pre-pressed prior to applying the surface layer 3 or may be scattered onto the substrate 2, preferably prior to pressing.

A surface layer 3 may applied on the first layer 1, thereby forming a second layer above the first layer 1. The surface layer 3 may be a veneer layer as shown in FIG. 1C. The surface layer may be or comprise a wood veneer or cork veneer. The density of the wood veneer may be at least 1000 kg/m³, for example, from 1000 to 5,000 kg/m³. The wood veneer layer may be formed of compressed wood veneer. By the wood veneer having a density of at least 1000 kg/m³, or being compressed to a density 1000 kg/m³, the hardness of the wood veneer is increased. Wood veneer is a thin wood layer, for example having a thickness of 0.2-1 mm. The surface layer 3 may be continuous or discontinuous. The surface layer 3 may be formed of several veneer pieces. The surface layer may be overlapping or non-overlapping. A gap may be formed between the veneer pieces.

When a surface layer 3 is applied on the first layer 1, the binder, such as a thermosetting binder of the above described type, simultaneously bonds the surface layer 3 with the first layer 1 during pressing. When heat and/or pressure are applied to the first layer 1, the thermosetting binder becomes fluid before cross-linking takes place. The applied heat and pressure results in curing of the thermosetting binder of the first layer 1, simultaneously as bonding the surface layer 3 to the first layer 1.

In an embodiment, a produced building element may be 6-25 mm thick, preferably 8-15 mm thick after pressing, while the substrate may be 5-22 mm thick, preferably 7-14 mm thick. The first layer may be 0.1-2 mm thick after pressing.

Figure 1B:
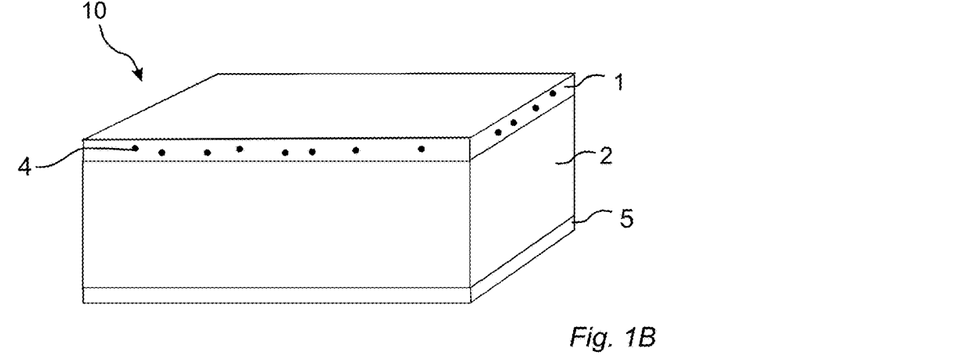
FIG. 1B shows an embodiment of a building element.
Figure 1C:
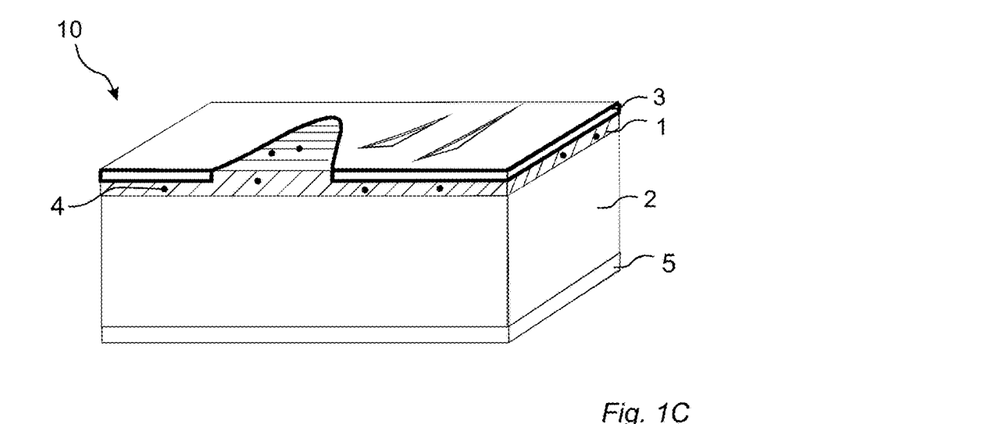
FIG. 1C shows an embodiment of a building element.
Figure 1D:
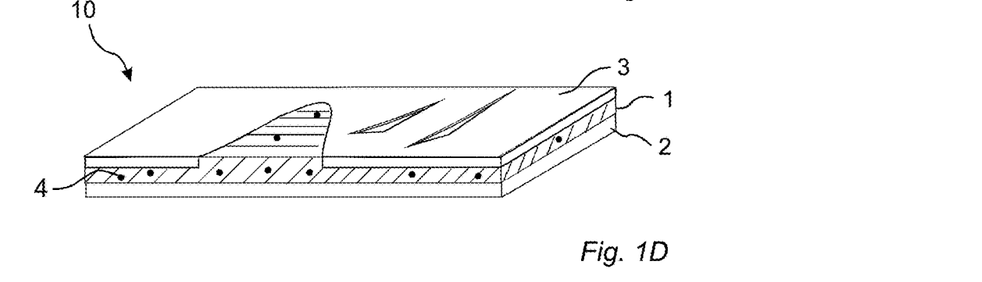
FIG. 1D shows an embodiment of a building element.

Exemplary building elements 10 produced by embodiments of the above described method are shown in FIGS. 1B-D.

In the embodiment shown in FIG. 1B, the building element 10 is a building panel. The building element comprises the first layer 1 as described above, the substrate 2 of the above described type and the balancing layer 5.

In the embodiment shown in FIG. 1C, the building element is a building panel. The building element comprises the first layer 1 as described above, the substrate 2 of the above described type and the balancing layer 5. In the embodiment shown in FIG. 1C, the building element 10 further comprises a surface layer 3, comprising a wood veneer.

In the embodiment shown in FIG. 1D, the building element 10 comprises the first layer 1 as described above, a surface layer 3 comprises a first wood veneer arranged on the first layer 1, and a substrate 2 comprising a second wood veneer arranged below the first layer 1.

The first layer may be applied in a powder form.

According to an aspect, the building panel is a floor panel or wall panel.

According to an aspect, a building element 10 may comprise a first layer 1 arranged on a substrate 2, the first layer comprising a mixture of a binder, at least one filler and fine non-pigment cohesive particles, wherein said building element is assembled by applying heat and/or pressure to the first layer 1 and/or substrate 2.

A building element according to the above aspects may incorporate all the advantages of the method, which previously has been discussed, whereby the previous discussion is applicable also to the building element.

It is contemplated that there are numerous modifications of the embodiments described herein, which are still within the scope of the invention as defined by the appended claims. For example, it is contemplated that more than one wear resistant foil may be arranged on a core for forming a building panel.

EXAMPLES

Example 1

Figure 2A:
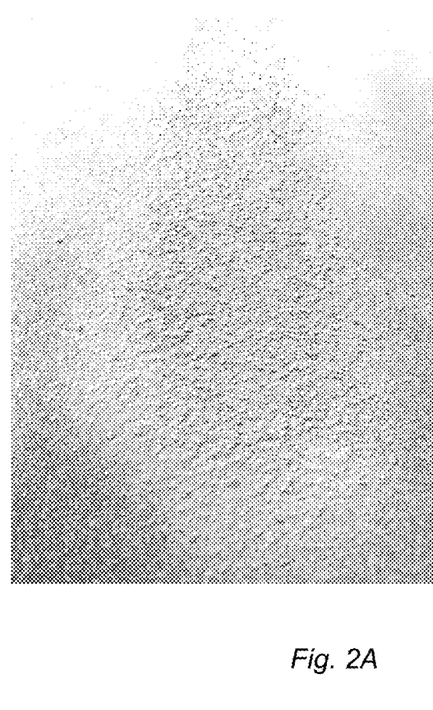
FIG. 2A shows a reference powder composition.
Figure 2B:
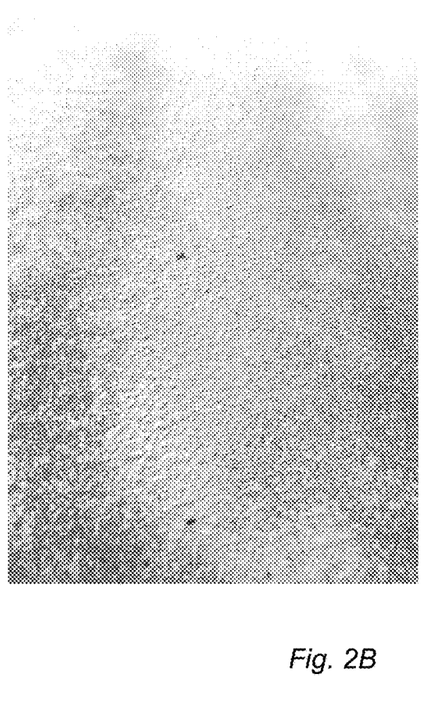
FIG. 2B shows an exemplary powder composition in accordance with an embodiment of the invention.

Different powder formulations comprising wood fibres and melamine-formaldehyde resin were made with increasing concentration of ASP® G90, a fine particle aluminium silicate, in order to investigate a connection between the powder free flow and the concentration of ASP® G90 as demonstrated in Table 1. The powder formulations were placed in glass jars to approximately half their volume and visually evaluated as the powders were let flowing by adding an external force to the jars. The typical powder which was considered was flowing without forming aggregates and did not show heavy dust formation which tended to partly adsorb to the jar walls. Acceptable formulation has a more even particle size distribution (FIG. 2B) compared to the reference powder (FIG. 2A).

TABLE 1

Free flow experiment with different concentrations of ASP ® G90

| Formulation | ASP G90 (wt %) | MF (wt %) | Wood fibres (wt %) |
|---|---|---|---|
| A (Ref) | 0 | 54 | 46 |
| B | 1 | 53.5 | 45.5 |
| C | 2 | 53 | 45 |
| D | 3 | 52.5 | 44.5 |
| E | 5 | 51.5 | 42.5 |

Formulation B-E showed significantly higher free flow as visually evaluated than the reference powder A (Ref). There was visually a remarkable improvement between formulation B and C but no notable difference between samples C, D and E.

Example 2

Different powder formulations comprising wood fibres and a melamine-formaldehyde resin were made with increasing concentration of AEROSIL® 200, a very fine particle fumed silica, in order to investigate a connection between the powder free flow and the concentration of AEROSIL 200®. The mixture compositions are shown in Table 2. The powder formulations were evaluated as described in the Example 1.

TABLE 2

Free flow experiment with different concentrations of AEROSIL ® 200.

| Formulation | AEROSIL ® 200 (wt %) | MF (wt %) | Wood fibres (wt %) |
|---|---|---|---|
| A (Ref) | 0 | 54 | 46 |
| F | 0.1 | 53.95 | 46.95 |
| G | 3 | 52.5 | 44.5 |

Figure 3A:
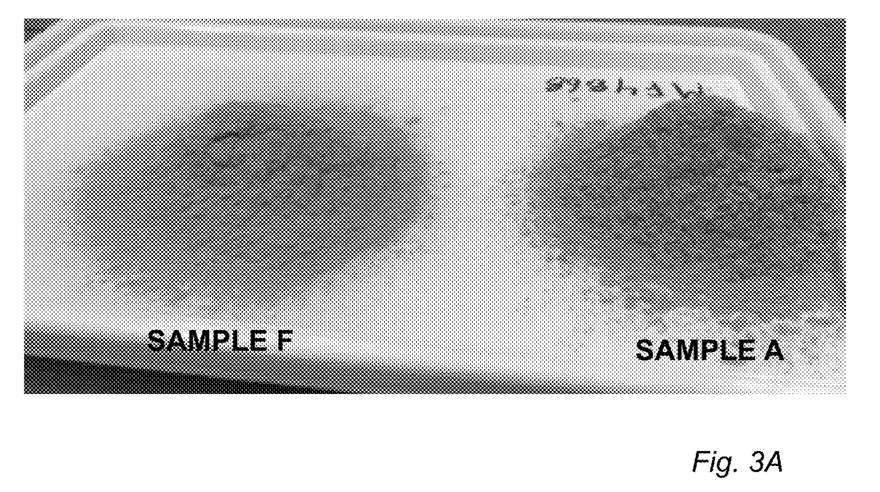
FIG. 3A shows a result of a free fall experiment of sample A and sample F in Example 1.
Figure 3B:
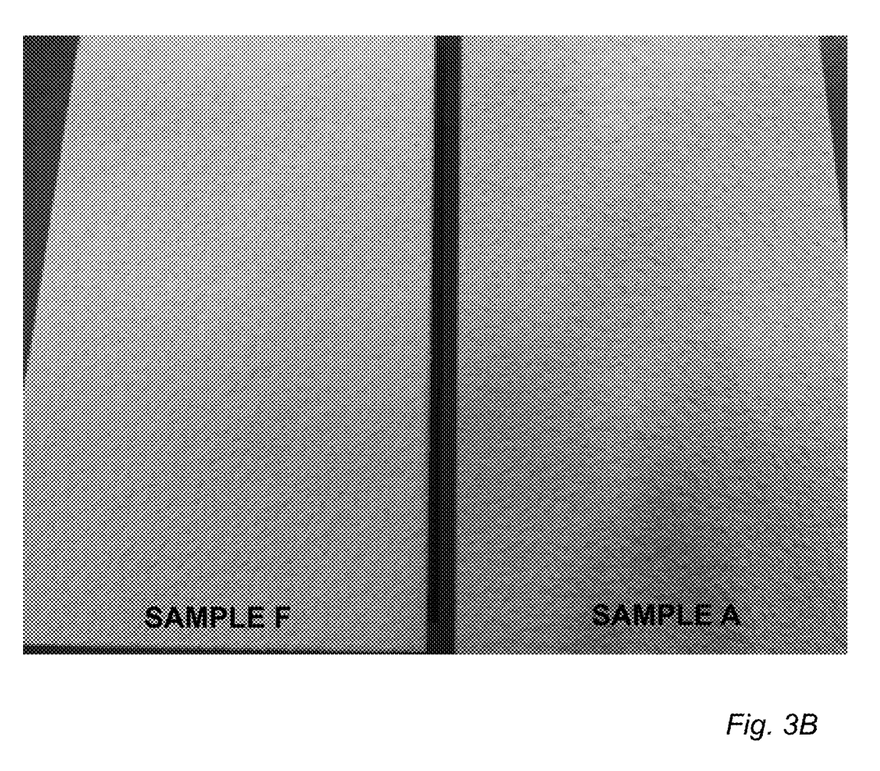
FIG. 3B shows a result of a scattering experiment of sample A and sample F in Example 2.

Formulation F and G showed visually remarkable higher free flow than the reference A (Ref), which is further visualized in FIGS. 3A-3B, wherein Sample F is shown as compared to the reference sample A.

When formulations B-E and F-G were used further in the method of manufacturing a building element the formulation was easy to distribute, did not form aggregates. The formulation provided for an even layer thereby improving properties of the first layer and binding of the first layer to the substrate.

Example 3

From four standardised formulations (A-D in Table 3 below), wherein only the additive part was switched between different inorganic non-pigment fine cohesive particles. These formulations were then run in a permeability program using a Freeman Technology FT4 Powder Rheometer where air is forced through a powder bed at different pressures. Pressure drop is directly negative proportional to permeability. A plot of Pressure drop vs. Applied normal stress was obtained where a high pressure drop is due to a low permeability, meaning higher cohesion in the powder. All powders were then visually inspected and the flowability compared using the glass jar method mentioned in Example 1.

TABLE 3

Standardised formulations.

| Recipe type | A (wt %) | B (wt %) | C (wt %) | D (wt %) | Reference |
|---|---|---|---|---|---|
| Wood fibre | 37.5 | 37.5 | 40 | 41.5 | 42 |
| MF resin | 49 | 52.5 | 52 | 52.5 | 53 |
| Aluminium oxide | 5 | 5 | 5 | 5 | 5 |
| Additive | 8.5 | 5 | 3 | 1 | — |

Additives used
MIKHART ® C (CaCO3)
BaSO4 BB30EX
POLYGLOSS ® 90/ASP ® G90 (aluminium silicate)
Micro talc
Calcinated kaolin
ALGOFLON ® (polytetrafluoreten)
HDK ® N20 (fumed silica)

Figure 4A:
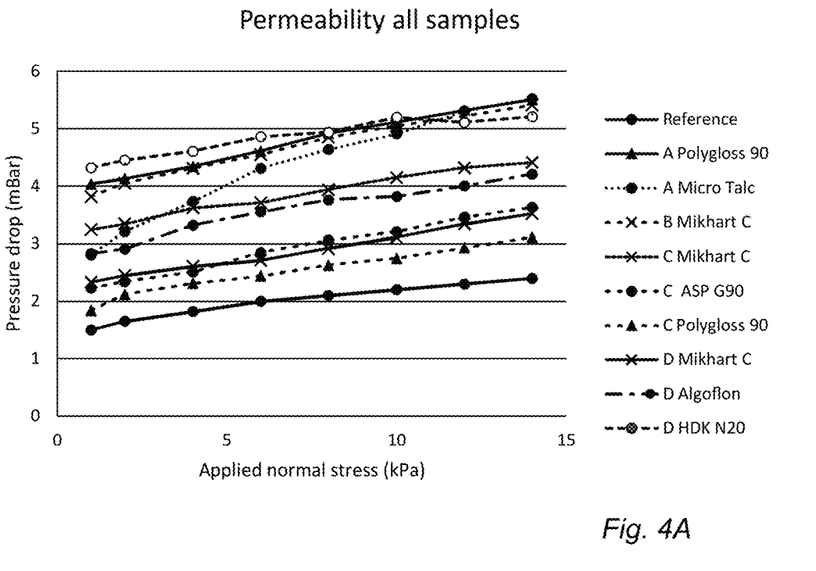
FIG. 4A shows permeability results of selected fine non-pigment cohesive particles compared to a reference sample.

Presented in FIG. 4A is the permeability results, indicating that all samples behaved more cohesively than the reference, as expected. Also, all samples behaved visually more free flowing in the glass jar experiment than the reference. However, seen in FIG. 4B the powder cohesion increased when increasing a certain additive, which was not the case for the free flow. The reference tended to behave with bridge building (mechanical interlocking), which decreased when adding any presented additive up a certain concentration, where the free flow began to decrease again due to the cohesive forces. The optimum free flow agent concentration for the additives presented in this example was 0.5-5 wt %, highly depending on an additive type.

Figure 4B:
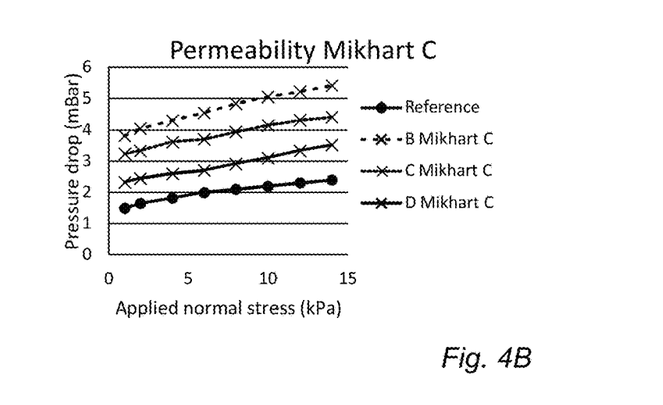
FIG. 4B shows permeability results dependent on concentration of calcium carbonate represented by MIKHART C®.
Figure 4C:
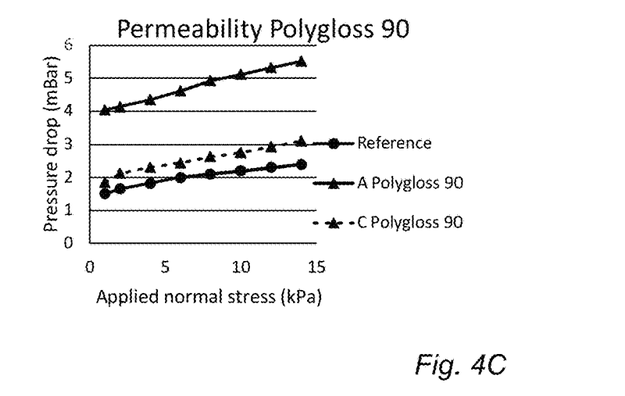
FIG. 4C shows permeability results dependent on concentration of fine high brightness aluminium silicate represented by POLYGLOSS 90®.

FIG. 4B shows permeability results for MIKHART® C, wherein B, C, D represent the different formulations in Table 3. FIG. 4C shows permeability results for POLYGLOSS® 90 wherein A and C represent the different formulations in Table 3.

When the word "about" or "essentially" is used in this specification in connection with a numerical value, it is intended that the associated numerical value include a tolerance of +/−10% around the stated numerical value.

Embodiments

1. A method of manufacturing a building element (10), comprising applying a first layer (1) on a first surface of a substrate (2), the first layer (1) comprising a mixture of a binder, at least one filler and fine non-pigment cohesive particles, wherein an amount of the fine non-pigment cohesive particles in the mixture is between 0.05 wt % and 9 wt % of the mixture, applying heat and/or pressure to the first layer (1) and/or the substrate (2) thereby forming the building element (10).

2. The method according to embodiment 1, wherein a cohesion force of said cohesive particles is exceeding a cohesive force of said at least one filler.

3. The method according to embodiment 1 or 2, wherein a cohesion force of said cohesive particles is at least 0.25 kPa, as measured with standard Shear Cell Program, 50 mm shear 6 kPa (FT4 Powder Rheometer).

4. The method according to any one of the preceding embodiments, wherein the mixture is applied in a dry form.

5. The method according to any one of the preceding embodiments, wherein at least 70% of the fine non-pigment cohesive particles have a length in their largest dimension of 2.5 µm or less, preferably a length in their largest dimension between 0.1 µm and 2.5 µm.

6. The method according to any one of the preceding embodiments, wherein the fine non-pigment cohesive particles have a refractive index (RI) of less than 1.9.

7. The method according to any one of the preceding embodiments, wherein the fine non-pigment cohesive particles are selected from silicates, such as aluminium silicate or silicon oxides, such as $SiO_2$.

8. The method according to embodiment 7, wherein $SiO_2$ is provided as fumed silica.

9. The method according to any one of embodiments 1-6, wherein the fine non-pigment cohesive particles is selected from calcium carbonate, barium sulphate, polytetrafluoroethylene.

10. The method according to any one of the preceding embodiments, wherein said at least one filler comprises wood powder.

11. The method according to any one of the preceding embodiments, wherein the binder is a thermosetting binder.

12. The method according to any one of the preceding embodiments, wherein the first layer (1) further comprises wear resistant particles.

13. The method according to any one of the preceding embodiments, wherein the first layer (1) further comprises pigment particles.

14. The method according to any one of the preceding embodiments, wherein the substrate (2) is a wood-based board, a particleboard, a thermoplastic board, a plywood, a lamella core, a veneer layer.

15. A building element (10), comprising
a first layer (1) arranged on a substrate (2), the first layer (1) formed by a mixture comprising a binder, at least one filler and fine non-pigment cohesive particles,
wherein an amount of the fine non-pigment cohesive particles in the mixture is between 0.05 wt % and 9 wt % of the mixture,
wherein said building element (10) is formed by applying heat and/or pressure.

16. The building element according to embodiment 15, wherein a cohesion force of said cohesive particles is exceeding a cohesive force of said at least filler.

17. The building element according to embodiment 15 or 16, wherein a cohesion force of said cohesive particles is at least 0.25 kPa, as measured with standard Shear Cell Program, 50 mm shear 6 kPa (FT4 Powder Rheometer).

18. The building element according to any one of embodiments 15-17, wherein the mixture is applied in a dry form.

19. The building element according to any one of embodiments 15-18, wherein at least 70% of the fine non-pigment cohesive particle has a length in its largest dimension of 2.5 µm or less, preferably a length in its largest dimension between 0.1 µm and 2.5 µm.

20. The building element according to any one of embodiments 15-19, wherein the fine non-pigment cohesive particles have a refractive index (RI) of less than 1.9.

21. The building element according to any one of embodiments 15-20, wherein the fine non-pigment cohesive particles are selected from silicates, such as aluminium silicate or silicon oxides, such as SiO2.

22. The building element according to embodiment 21, wherein $SiO_2$ is provided as fumed silica.

23. The building element according to any one of embodiments 15-20, wherein the fine non-pigment cohesive particles is selected from calcium carbonate, barium sulphate, polytetrafluoroethylene.

24. The building element according to any one of embodiments 15-23, wherein said at least one filler comprises wood powder.

25. The building element according to any one of embodiments 15-24, wherein the binder is a thermosetting binder.

26. The building element according to any one of embodiments 15-25, wherein the first layer (1) further comprises wear resistant particles.

27. The building element according to any one of embodiments 15-26, wherein the first layer (1) further comprises pigment particles.

28. The building element according to any one of embodiments 15-27 wherein the substrate (2) is a wood-based board, a particleboard, a thermoplastic board, a plywood, a lamella core, a veneer layer.

The invention claimed is:

1. A method of manufacturing a building panel, the method comprising:
applying a first layer on a first surface of a substrate, the first layer comprising a mixture of a binder, at least one wood filler and a mix of fine non-pigment cohesive particles, the mix containing at least 70% of fine non-pigment cohesive particles with a length in their largest dimension of 2.5 µm or less, wherein the fine non-pigment cohesive particles are in the mixture in an amount of between 0.05 wt % and 9 wt % of the mixture, wherein the fine non-pigment cohesive particles are configured to contribute to a flowability of the mixture of the first layer when the first layer is applied on the first surface of the substrate, wherein a cohesion force of said cohesive particles exceeds a cohesive force of said at least one wood filler; and
applying heat and/or pressure to the first layer and/or the substrate thereby forming the building panel,
wherein the fine non-pigment cohesive particles include barium sulphate.

2. The method according to claim 1, wherein the mixture is applied in a dry form.

3. The method according to claim 1, wherein the fine non-pigment cohesive particles include silicates or silicon oxides.

4. The method according to claim 3, wherein $SiO_2$ is provided as fumed silica.

5. The method according to claim 1, wherein the fine non-pigment cohesive particles include barium sulphate in combination with: calcium carbonate and/or polytetrafluoroethylene.

6. The method according to claim 1, wherein said at least one wood filler comprises a wood powder.

7. The method according to claim 1, wherein the binder is a thermosetting binder.

8. The method according to claim 1, wherein the first layer further comprises wear resistant particles.

9. The method according to claim 1, wherein the first layer further comprises pigment particles.

10. The method according to claim 1, wherein the substrate is a wood-based board, a particleboard, a thermoplastic board, a plywood, a lamella core, or a veneer layer.

11. The method according to claim 1, wherein the fine non-pigment cohesive particles are in the mixture in an amount of between 0.5 wt % and 5 wt % of the mixture.

12. The method according to claim 1, wherein the fine non-pigment cohesive particles are in the mixture in an amount of between 1 wt % and 7 wt % of the mixture.

13. The method according to claim 1, wherein the fine non-pigment cohesive particles are in the mixture in an amount of between 2 wt % and 6 wt % of the mixture.

14. The method according to claim 1, wherein the cohesive particles coat the at least one wood filler.

\* \* \* \* \*